(12) United States Patent
Tysowski et al.

(10) Patent No.: US 7,334,085 B2
(45) Date of Patent: Feb. 19, 2008

(54) METHOD AND APPARATUS FOR FULL AND PARTIAL STORAGE OF DATA RECORDS IN AN ELECTRONIC DEVICE

(75) Inventors: Piotr K. Tysowski, Waterloo (CA); Michael T. Hardy, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 248 days.

(21) Appl. No.: 11/284,923

(22) Filed: Nov. 23, 2005

(65) Prior Publication Data

US 2007/0118709 A1    May 24, 2007

(51) Int. Cl.
*G06F 12/00* (2006.01)
*G06F 17/30* (2006.01)

(52) U.S. Cl. ............... 711/115; 711/162; 711/165; 711/170; 707/101; 707/201

(58) Field of Classification Search ........... 711/115, 711/154, 162, 170; 707/101, 201
See application file for complete search history.

(56) References Cited

U.S. PATENT DOCUMENTS

2002/0059299 A1   5/2002   Spaey

*Primary Examiner*—Jack Lane
(74) *Attorney, Agent, or Firm*—Perry + Currier (57) ABSTRACT

A method for memory management in an electronic device includes receiving partial content data records at the electronic device, storing the partial content data records in a memory of the electronic device, receiving a full content data record corresponding to one of the partial content data records, determining whether or not sufficient memory is available in the memory of the electronic device to store the full content data record and, if so, writing the full content data record over the corresponding partial content data record stored in the memory; and repeating the receiving and determining until either: full content data records corresponding to each of the partial content data records are received; or a low memory condition is determined in the memory. The partial content data records include key fields of data sufficient for uniquely identifying corresponding full content data records at a second electronic device.

11 Claims, 7 Drawing Sheets

METHOD AND APPARATUS FOR FULL AND PARTIAL STORAGE OF DATA RECORDS IN AN ELECTRONIC DEVICE

FIELD

The present application relates generally to portable electronic devices and more particularly to memory management in an electronic device.

BACKGROUND

Portable electronic devices such as wireless personal digital assistants (PDAs), smart telephones and laptop computers with wireless capabilities have gained widespread use for a variety of functions. Such devices are commonly used for communication purposes including transportation of data, and run on a wide variety of networks from data-only networks such as Mobitex and DataTAC to complex voice and data networks such as GSM/GPRS, CDMA, EDGE, UMTS AND W-CDMA networks.

These portable electronic devices commonly include databases for storing data that is selectably retrievable by a user of a device. The data forms a series of data records, each data record containing one or more fields. During operation of the device, the data is retrieved and displayed, or otherwise made available to the user. The data can be modified, added to or deleted by the user of the device.

Advances in data storage have accompanied advances in portable electronic devices, to provide for back-up of data stored at the electronic device. By backing-up the device, data can be recovered in the event of data loss at the electronic device. Various electronic devices are backed-up by way of communication over a fixed (wire) connection between the electronic device and, for example, a computing station such as a desktop computer. Once the data is stored in a database at the computing station, the stored data can be modified, added to or deleted by a user at the computing station.

Other portable electronic devices provide for back-up of data stored thereon, to a computing station by way of a radio interface, using, for example, the networks listed above. Thus, data is sent over a radio communication channel of a radio communication system, thereby forming a communications link between the portable electronic device and a remote station (a station not linked by wire communication). Again, once the data is stored in a database at a computing station, the stored data can be modified, added to or deleted at the computing station. Thus, while data stored in the database of the portable electronic device is backed-up to a computing station, data is also transmitted from the computing station to the portable electronic device to synchronize the databases of the portable electronic device with the databases of the computing station. When a data record on a computing station does not exist on the portable electronic device, or when the content of the data record (the fields of the data record) of the computing station differs from the content of the data record of the portable electronic device, then the additional data record or differing data record is transferred to the portable electronic device. Similarly, when a data record on a portable electronic device does not exist on the computing station, or when the content of the data record of the portable electronic device differs from the content of the data record of the computing station, the additional data record or differing data record is transferred to the computing station. When a data record is deleted from the portable electronic device, a delete data record indication is sent from the portable electronic device to the computing station in order to delete the corresponding data record at the computing station.

Data synchronization over a radio communication channel is clearly advantageous as data can be communicated remotely over large distances. Conventional manners of data synchronization over radio communication channels suffer disadvantages, however. Such data synchronization can be prohibitively bandwidth consumptive. If many records are transferred, the transfer time can be extensive meaning that a communication channel is opened for a long period of time to transfer the data records, which can be costly. Furthermore, if many records are transferred, the portable electronic device may not have sufficient available memory for storage of all the data received.

Improvements in memory management in an electronic device are therefore desirable.

BRIEF DESCRIPTION OF THE DRAWINGS

The method and apparatus for memory management in an electronic device will be better understood with reference to the following description and to the Figures, in which.

DETAILED DESCRIPTION OF THE EMBODIMENTS

Figure 1:
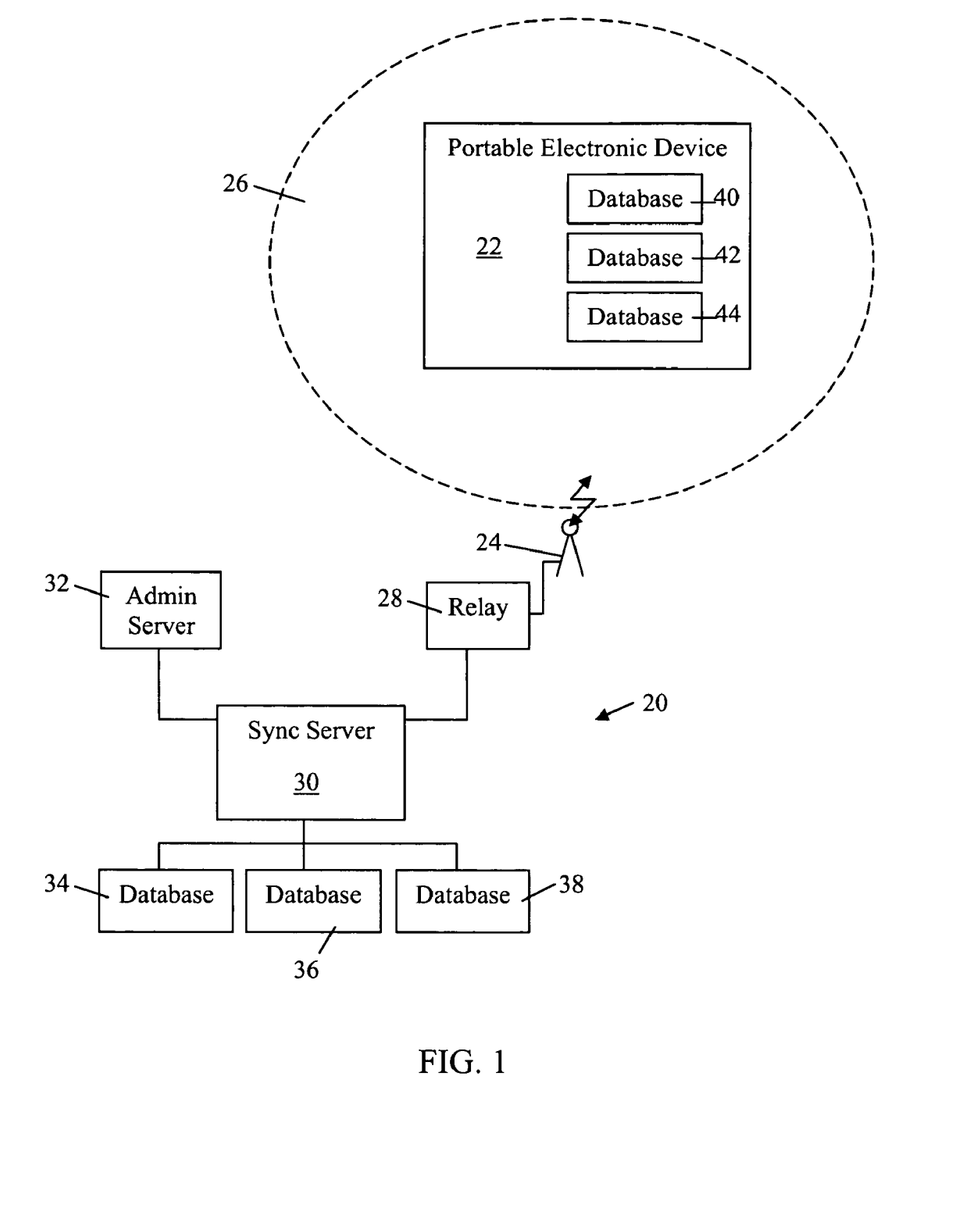
FIG. 1 is a functional block diagram of a radio communication system and portable electronic device.

Reference is first made to FIG. 1 which shows a functional block diagram of a radio communication system indicated generally by the numeral 20 and a portable electronic device 22. The radio communication system 20 provides for communications with portable electronic devices including the exemplary portable electronic device 22, as shown. The portable electronic device 22 and the radio communication system 20 are operable to effect communications over a radio communications channel therebetween. Data originating at the portable electronic device 22 is communicated to the radio communication system 20 by way of the radio communications channel. Similarly, data originating at the communication system 20 is communicated from the radio communication system 20 to the portable electronic device 22 by way of the radio communications channel, thereby providing data to the portable electronic device 22.

For the purposes of illustration, the communications system is functionally represented in FIG. 1 and a single base station 24 is shown. The base station 24 defines a coverage area, or cell 26 within which communications between the base station 24 and the portable electronic device 22 can be effected. It will be appreciated that the portable electronic device 22 is movable within the cell 26 and can be moved to coverage areas defined by other cells that are not illustrated in the present example. The communication system 20 includes a relay device 28 that is connected to the base station 24 and a synchronization server 30. It will be understood that the functions provided by the relay device 28 and the synchronization server 30 can be embodied in the same device. The synchronization server 30 is connected to an administration server 32, as shown. The administration server 32 provides administrative services to the communications system 20 and, for instance, provides administrative control over the synchronization server 30.

The synchronization server 30 is functionally coupled to databases, of which, three exemplary database types including a first database 34, a second database 36 and a third database 38, are shown. The databases of the present example are of a text format such as an Extensible Mark-up Language (XML) format. The data maintained in the first, second and third databases 34, 36, 38, includes a number of data records, each data record containing a plurality of fields that are populated with data. Particular ones of the fields of each data record that are populated are key fields that are sufficient to uniquely identify the data record in which they are contained.

The portable electronic device 22, of which only particular functional portions are shown in FIG. 1 for the purposes of the present description, includes a plurality of databases 40, 42, 44 that correspond to the first, second and third databases 34, 36, 38, respectively, of the communication system 20. The databases 34, 36, 38 and the databases 40, 42, 44, can be selectably altered in an asymmetrical manner such that the databases 34, 36, 38 of the communication system 20 do not match the databases 40, 42, 44 of the portable electronic device 22. In other words, any or all of the databases 34, 36, 38, 40, 42, 44 can be altered by adding records, deleting records and modifying fields of the records by adding, deleting or modifying the data populating those fields.

Figure 2:
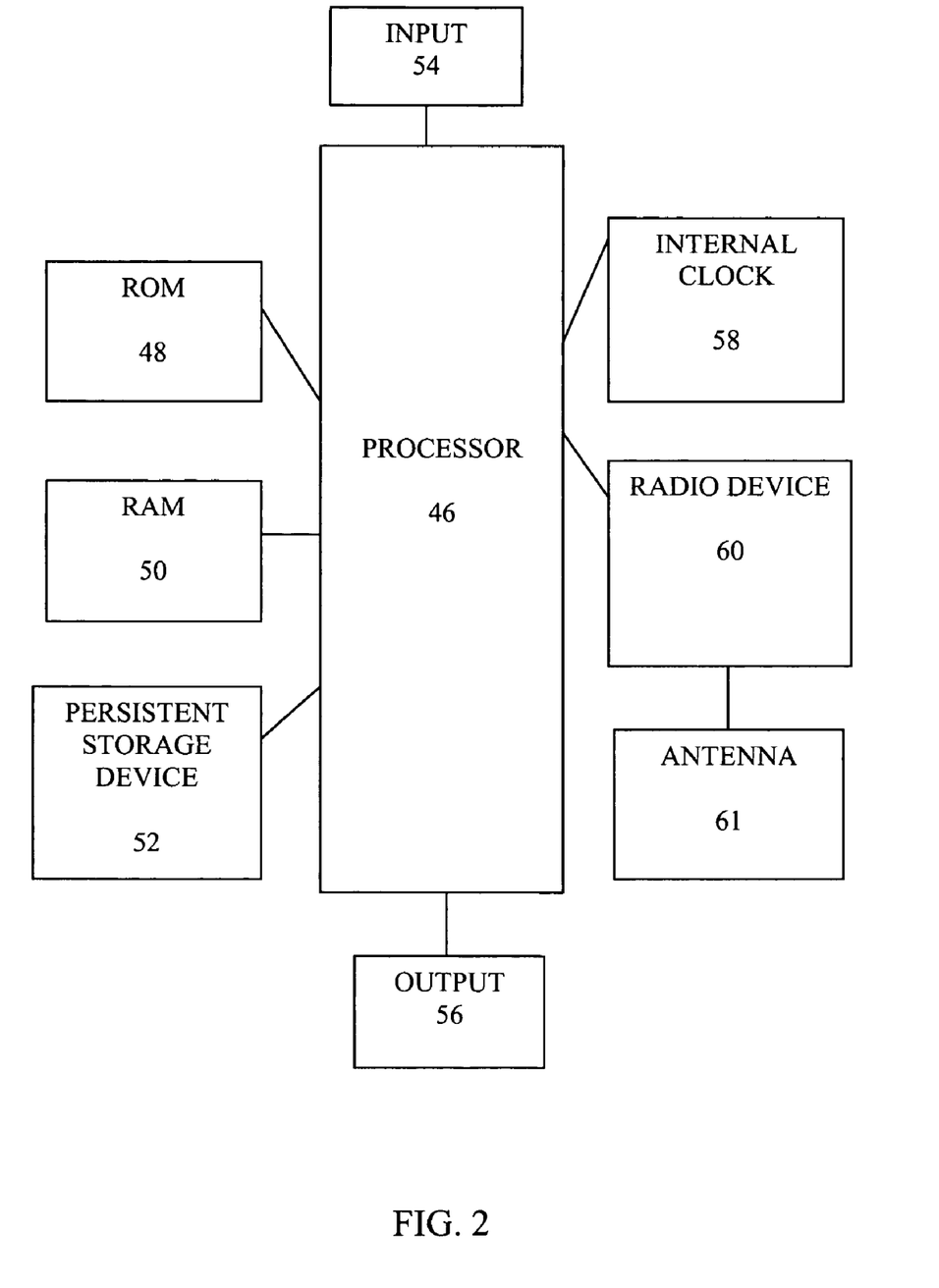
FIG. 2 is a block diagram of certain internal components within the portable electronic device.

Reference is now made to FIG. 2 which shows a block diagram of certain internal components within the portable electronic device 22. The portable electronic device 22 is based on a microcomputer that includes a processor 46 connected to a read-only-memory (ROM) 48 that contains a plurality of applications executable by the processor 46 to enable the portable electronic device 22 to perform certain functions including synchronization with the communication system 20. The processor 46 is also connected to a random access memory unit (RAM) 50 and a persistent storage device 52 which are responsible for various non-volatile storage functions of the portable electronic device 22 and in which the databases 40, 42, 44 are maintained. The processor 46 receives input from input devices 54 such as a keyboard. The processor 46 outputs to output devices 56 such as an LCD display. The processor 36 is also connected to an internal clock 58 and a radio device 60 which in turn is connected to an antenna 61. Together the radio device 60 and the antenna 61 are used to connect to the radio communication system 20 over a radio communications channel. Thus, the portable electronic device 22 is operable to receive and transmit communication signals containing data that is communicated to and from the communication system 20 via the radio device 60 and the antenna 61.

It will be understood that the functions described herein can be carried out in any suitable manner. In the present example, the functions are carried out by algorithms executable by the processor 46 in a synchronization application. For example, the processor 46 of the portable electronic device 22 is operable to perform hash functions by retrieving the data from one or more of the databases 40, 42, 44 of the persistent storage device 52 and generating a hash, thereby placing the accessed data in short-digest form. Hash functions performed by the processor 46 include, for example, computation of check sums as well as other hash function computations. The processor 46 is further operable to provide the generated hash to the radio device 60 for transmission from the portable electronic device 22 to the radio communication system 20 over the radio communications channel. Hash generation is triggered either by an input from the input device 54 or by a signal received from communication system 20.

The microcomputer of the portable electronic device 22 is operable to receive communications from the communication system 20. For example, the microcomputer is operable to receive a request for additional hash information and in response, to provide additional hash information by retrieving data from one or more of the databases 40, 42, 44, performing hash functions on the data, thereby generating an additional hash and transmitting the additional hash to the communication system 20. The microcomputer is further operable to receive a request for data records which, in response to such a request, the data records are retrieved from one or more the databases 40, 42, 44 and transmitted to the communication system 20. Further still, the microcomputer is operable to receive data transmitted from the communication system 20 and to write the data by adding the data to one or more of the databases 40, 42, 44 or overwriting data on one or more of the databases 40, 42, 44, maintained on the persistent storage device 52. The microcomputer is further operable to determine a size of memory available on the persistent storage device 52, to compare the available memory to the memory required to store a data record. Further still, the microcomputer is operable to delete fields of data from a full content data record, to leave only key fields of data in a partial content data record and to overwrite the partial content data record over the full content data record of a database to make memory available on the persistent storage device 52.

Figure 3:
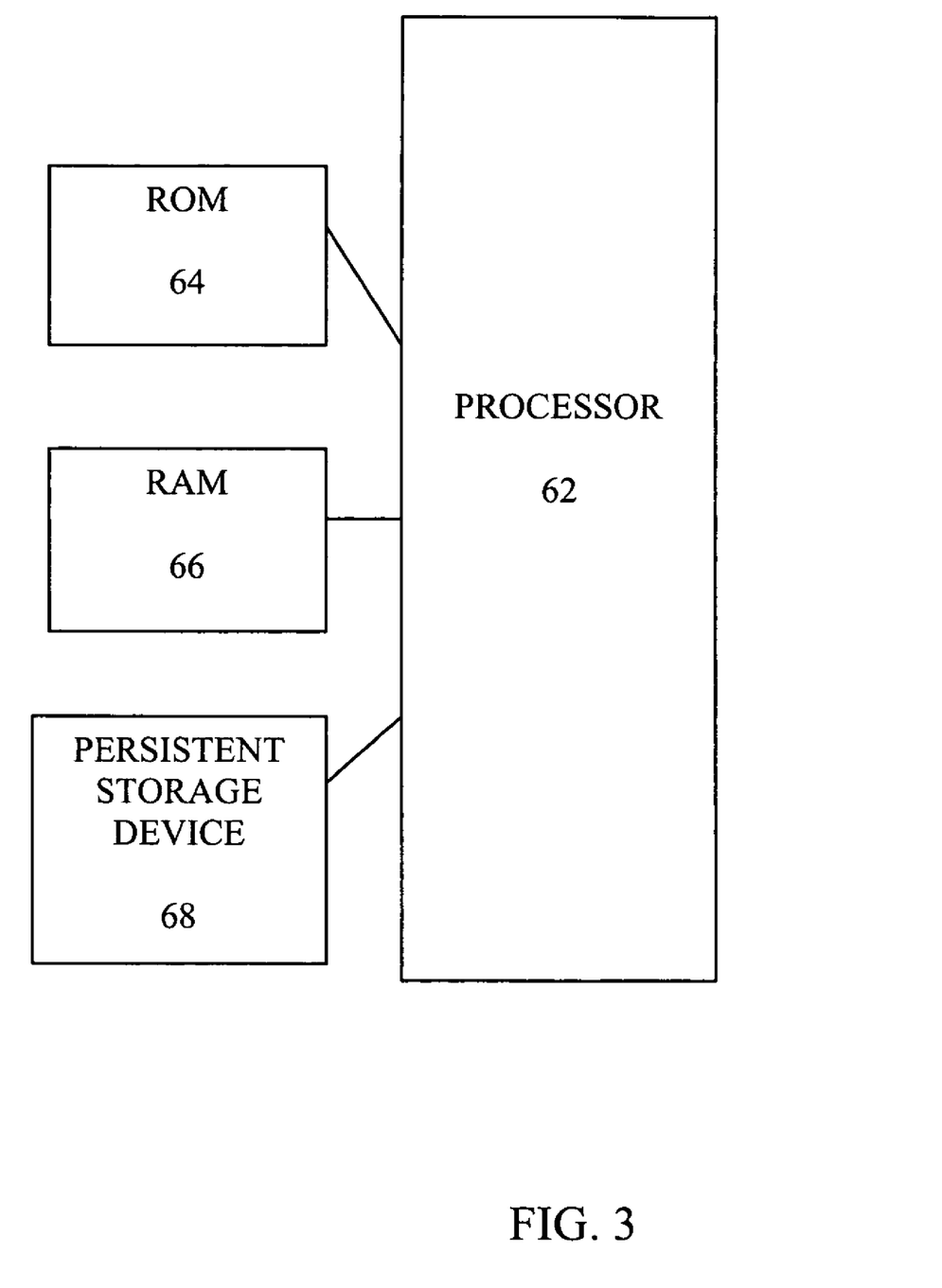
FIG. 3 is a block diagram of certain internal components within a synchronization server.

Reference is now made to FIG. 3 which shows a block diagram of certain internal components within the synchronization server 30. Similar to the portable electronic device 22, the synchronization server 30 includes a processor 62 connected to a read only memory (ROM) 64 that includes applications executable by the processor 62 and enables the synchronization server 30 to perform certain functions including synchronization with the portable electronic device 22. The processor 62 is also connected to a random access memory unit (RAM) 66 and a persistent storage device 68 which are responsible for various non-volatile storage functions of the synchronization server 30. The processor 62 is connected to the databases 34, 36, 38 and to the relay device 28, which in turn is connected to the base station 24 for connecting to the portable electronic device 22 over a radio communications channel. Thus, the synchronization server 30 is operable to receive and transmit communication signals containing data that is communicated to and from the portable electronic device 22 via the relay device 28 and the base station 24.

Again, it will be understood that the functions described herein can be carried out in any suitable manner. In the present example, the functions are carried out by algorithms executable by the processor 62. For example, the processor 62 of the synchronization server 30 is operable to perform hash functions by retrieving the data from one or more of the databases 34, 36, 38 and generating a hash, thereby placing the accessed data in short-digest form. The processor 62 is further operable to provide the generated hash to the relay device 28 for transmission to the portable electronic device 22.

The synchronization server 30 is operable to receive communications generated by the portable electronic device 22 relating to synchronization. For example, the synchronization server 30 is operable to receive the hash generated by the portable electronic device 22 and, in response, to compare the hash information from this hash to the hash information from the locally generated hash, generated by the synchronization server 30. The synchronization server 30 is also operable to request additional information from the portable electronic device 22, based on and in response to results of the comparison of the hash information from the hash generated by the portable electronic device 22 with the hash information from the locally generated hash. The request for additional information is provided to the relay 28 and, through the base station 24, is transmitted to the portable electronic device 22. The request for additional information can be a request for additional hash information or a request for data records, depending on the results of the comparison of the hash information from the hash generated by the portable electronic device 22 with the hash information from the locally generated hash. Further, the synchronization server 30 is operable to receive data transmitted from the portable electronic device 22 (through the base station 24 and relay device 28) and to write the data by adding the data to one or more of the databases 34, 36, 38 or overwriting the data on one or more of the databases 34, 36, 38. Further still, the synchronization server 30 stores synchronization history data in the persistent storage device 68, thereby maintaining a listing of changes made to the databases 34, 36, 38 connected to the synchronization server 30 and to the databases 40, 42, 44 of the portable electronic device 22. The synchronization server 30 accesses the synchronization history data during synchronization operations to reduce the data communicated between the communication system 20 and the portable electronic device 22 in subsequent synchronizations by determining previously synchronized data.

The synchronization server 30 is further operable to store an identifier, referred to herein as a full data record update type in association with each data record. The full data record update type is an indication that the data record is to be fully transferred to the portable electronic device 22 during synchronization processes over the radio communications connection. The full data record update type can be determined based on a number of factors. For example, the data record update type can be determined based on the database to which the data records belong. Data records from a User Profiles database can be indicated for full transfer of the entire record when a record is added or changed on the synchronization server 30, thereby ensuring that the data records of the User Profiles database on the portable electronic device 22 are always complete and match in full, the data records of the User Profiles database on the synchronization server 30. For other data records, however, full content may not be necessary and accordingly, these data records are not indicated as full data record update types.

Figure 4:
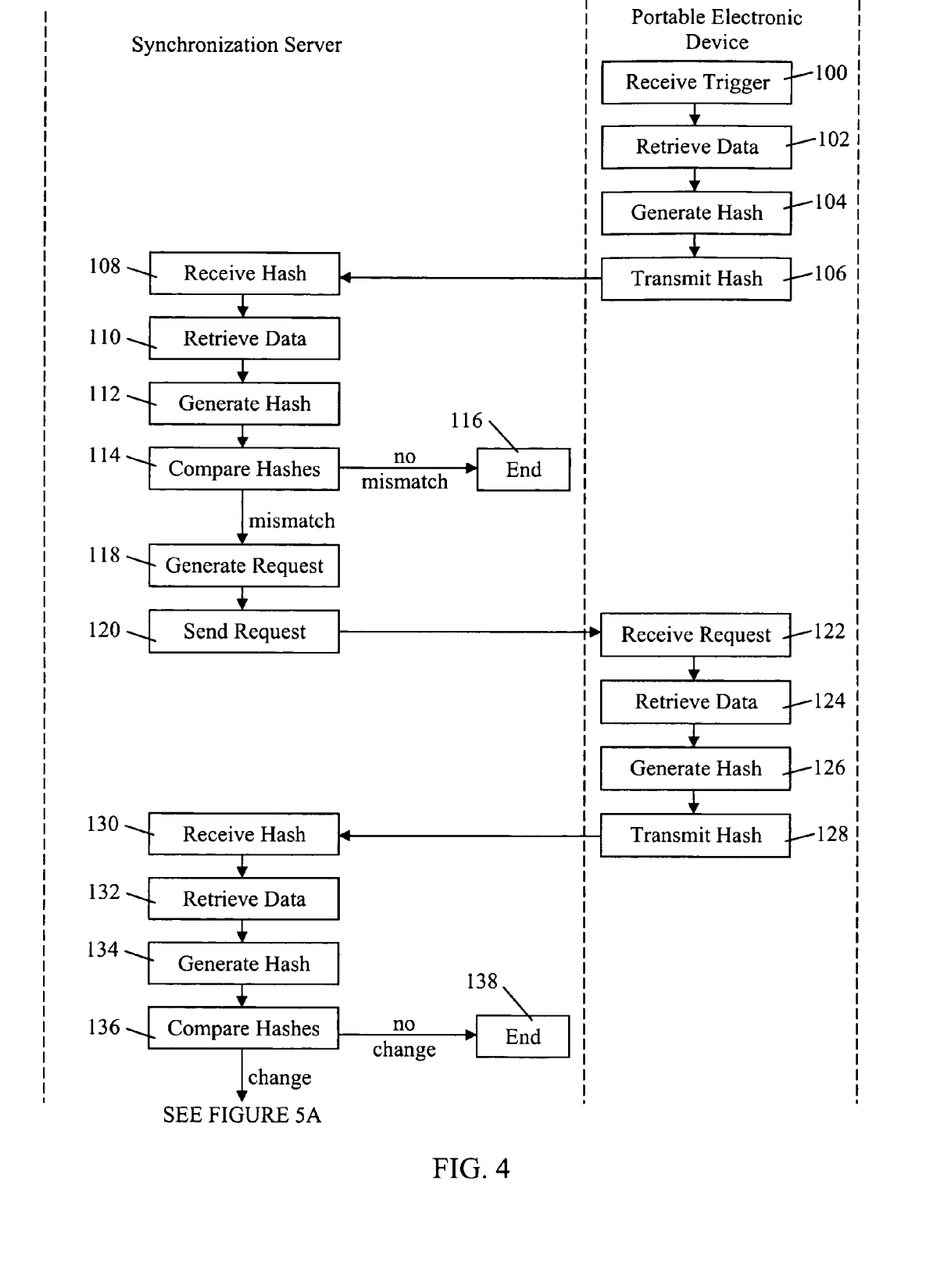
FIG. 4 is a sequence diagram illustrating functions carried out at both the portable electronic device and the communication system during synchronization of databases connected by wireless interface.

Reference is now made to FIG. 4, which shows a sequence diagram illustrating functions carried out at both the portable electronic device 22 and the communication system 20 during synchronization of databases connected by wireless interface, in accordance with one embodiment of the present application. Coding of software for carrying out such steps is well within the scope of a person of ordinary skill in the art. First, the portable electronic device 22 receives a synchronization trigger at 100, from, for example, a user input on the input device 54. Alternatively, the portable electronic device 22 receives a synchronization trigger from the communication system 20. In response to receipt of the synchronization trigger, data is retrieved from the databases 40, 42, 44 at step 102 and the processor 46 generates a hash for each database 40, 42, 44 at step 104. After generation of each hash, each hash is transmitted at step 106 to the communication system 20 over a radio communication channel.

The communication system 20 receives each hash at step 108 by receipt at the base station 24 and forwards the hashes on to the synchronization server 30. In response to receipt of each hash from the portable electronic device 22, data is retrieved from the databases 34, 36, 38 at step 110 and the processor 62 of the synchronization server 30 generates a hash for each respective database (referred to herein as the locally generated hash) at step 112. After generation of each locally generated hash, the hash information of each hash received from the portable electronic device 22 is compared with the hash information of the corresponding locally generated hash at step 114. If the comparison of the hash information indicates that the databases 40, 42, 44 of the portable electronic device 22 are not in mismatch with the respective databases 34, 36, 38 of the communication system 20, then the synchronization process ends at step 116. If, however, the comparison of the hash information indicates that any one of the databases 40, 42, 44 of the portable electronic device 22 are in mismatch with the respective databases, 34, 36, 38 of the communication system 20, then at least one of the databases is to be updated and a request for additional hash information is generated by the synchronization server 30 at step 118. The request for additional hash information is a request for hash information associated with data records. The additional hash information is requested for each data record of a particular database of the portable electronic device 22 that is determined to be mismatched with the corresponding database of the communication system 20. After generation of the request for additional hash information, the request is then transmitted at step 120 to the portable electronic deice 22.

Once the request for additional hash information is received at the portable electronic device 22 at step 122, data is retrieved from one or more of the databases 34, 36, 38 at step 124, in accordance with the request for additional hash information. An additional hash is then generated at step 126 for each of the data records of the respective database, and each hash is transmitted at step 128 to the communication system 20 over the radio communication channel. For those partial content data records in the databases 40, 42, 44 of the portable electronic device for which only key data fields are present, the respective hash is generated based only on the key data fields.

The additional hash information is received at the communication system 20 and delivered to the synchronization server 30 at step 130. In response to receipt of the requested additional hash information, additional data is retrieved from one or more of the corresponding databases 34, 36, 38 at step 132 and an additional hash (referred to as the additional locally generated hash) is generated for each of the corresponding data records of the respective database at step 134. For particular data records wherein only key data fields are present in the corresponding database on the portable electronic device 22, the hash is generated from only the key data fields. After generation of each additional locally generated hash, the additional hash information received from the portable electronic device 22 is compared with the additional hash information from each additional locally generated hash at step 136 and a determination is made as to whether the data, of which the additional hash information is representative, has changed. If it is determined that this data has not changed, the synchronization process ends for each data record for which the data has not changed at step 138. If, however, it is determined that this data has changed, the comparison at step 136 also determines what, if any, additional or changed data records at the communication system 20 are not reflected at the portable electronic device 22 and what, if any, additional or changed data records at the portable electronic device 20 are not reflected at the communication system 20. Thus, if it is determined that the data has changed at step 136, the databases are synchronized by updating the databases at communication system 20 or the portable electronic device 22 or databases at both the communication system 20 and the portable electronic device 22 that are determined to be mismatched. With the determination of a mismatch, a conflict resolution policy is run, thereby determining how the mismatched records are to be updated (i.e. whether to update the database records on the portable electronic device 22 with the database records of the synchronization server 30 or vice versa).

Figure 5A:
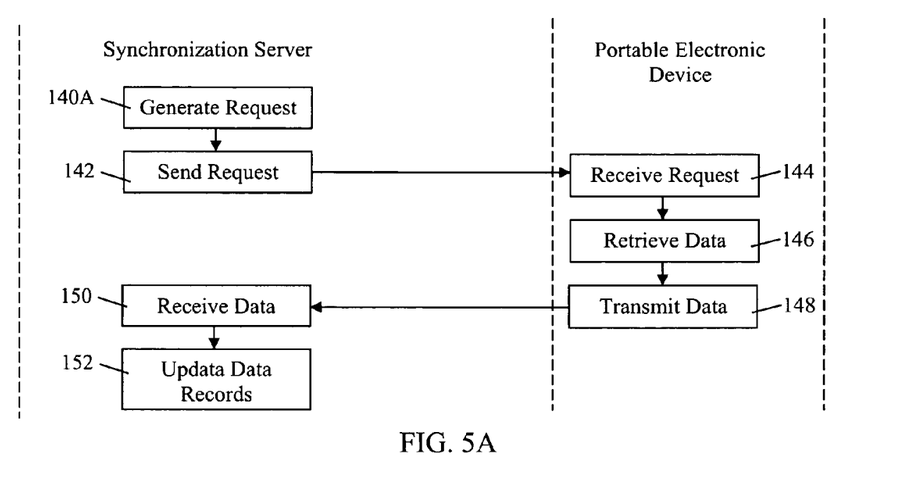
FIGS. 5A and 5B are sequence diagrams illustrating functions carried out at both the portable electronic device and the communication system during updating of databases.

Referring now to FIG. 5A, there is shown a sequence diagram illustrating functions carried out at both the portable electronic device 22 and the communication system 20 during updating of the databases 34, 36, 38 of the communication system 20. Again, coding of software for carrying out such steps is well within the scope of a person of ordinary skill in the art. If it is determined at step 136 that additional data records or changes to data records at the portable electronic device 20 are not yet reflected at the communication system 20, a fetch request is generated by the synchronization server 30 as shown at step 140A. After generation of the fetch request, the fetch request is transmitted to the portable electronic device 22 at step 142, thereby requesting data records added and changed on the portable electronic device 22 that have not been updated on the synchronization server 30.

The fetch request is then received at the portable electronic device 22 at step 144 and in response, the requested data records are retrieved from the databases 40, 42, 44 at step 146. After retrieving the data records, the retrieved data records are transmitted to the communication system 20 at step 148.

The requested data records are then received at the communication system 20 and delivered to the synchronization server 30 at step 150. In response to receipt of the requested data records, the respective ones of the databases 34, 36, 38 of the communication system 20 are updated by writing new data records or overwriting to update previously saved data records in the respective databases 34, 36, 38. It will be understood that data records retrieved from one database of the portable electronic device 20 and transmitted to the communication device 20, are written to or overwritten on to the corresponding database of the communication system 20.

Figure 5B:
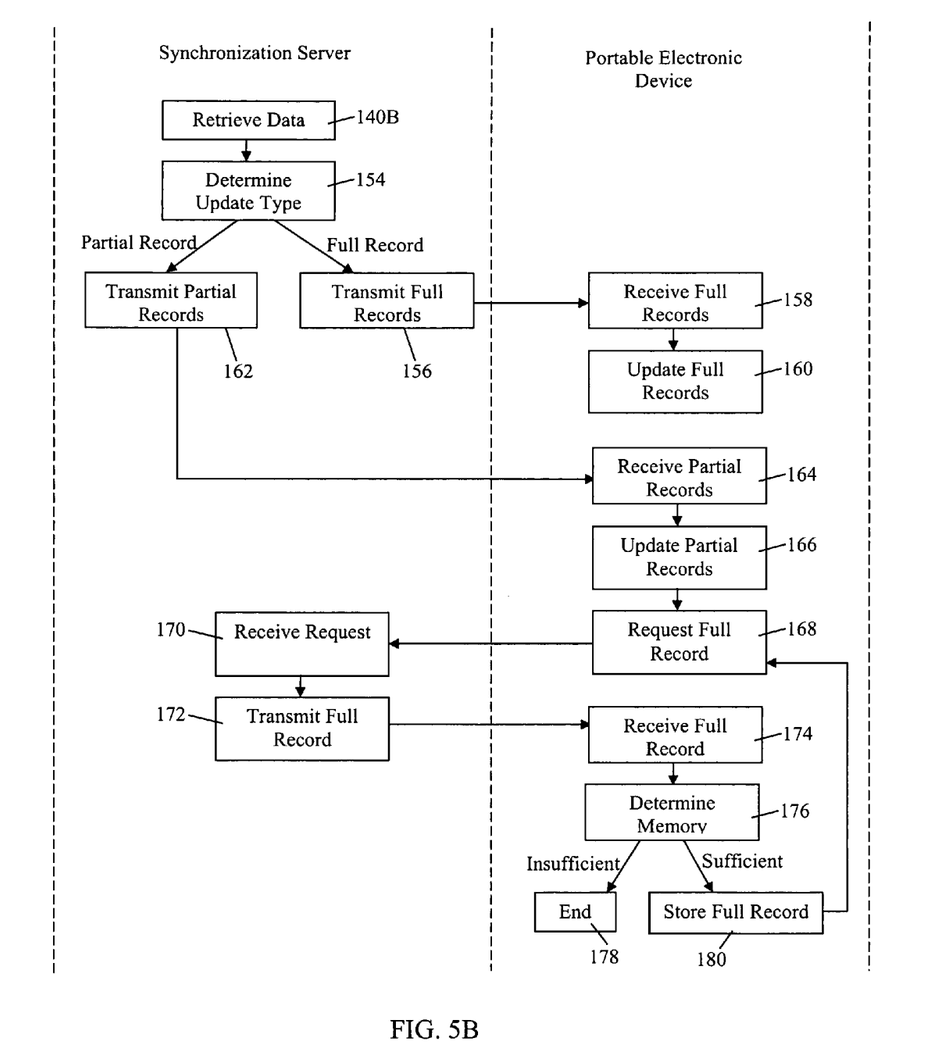

Referring now to FIG. 5B, there is shown a sequence diagram illustrating functions carried out at both the portable electronic device 22 and the communication system 20 during updating of the databases 40, 42, 46 at the portable electronic device 22. Yet again, coding of software for carrying out such steps is well within the scope of a person of ordinary skill in the art.

If it is determined at step 136 that additional data records or changes to data records at the communication system 20 are not reflected at the portable electronic device 20, the data records that have been added or changed on the synchronization server 30 that have not been updated on the portable electronic device 22 are retrieved at step 140B. The data record update type is then determined at step 154. As indicated hereinabove, the data record update type is an indication of whether or not the data record is to be fully transferred to the portable electronic device 22 during the synchronization process over the radio communications connection.

If, for a particular record, it is determined that the full record is to be transferred based on the determination at step 154, the full record is transmitted at step 156.

The portable electronic device 22 receives the full record at step 158 and updates the data records at step 160 by overwriting to update the previously saved data record in the respective database 40, 42, 44. Again it will be understood that the data records retrieved from one database of the communication system 20 and transmitted to the portable electronic device 22, are overwritten on to the corresponding database of the portable electronic device 22.

If, on the other hand, it is determined at step 154, that a particular record is not indicated as a full data record update type, only the key fields of the data record are transmitted at step 162. The key fields are fields of the data record that are sufficient to uniquely identify the data record in which they are contained. Thus, only partial content of the data record is transmitted at step 162. The key fields act as a reference to the respective data record of the communication system 20 to which the key fields belong.

The partial content data record containing only key fields that are transmitted at step 162 is received at the portable electronic device 22 at step 164, marked as a partial content data record and the records of the portable electronic device 22 are updated with this partial content data record at step 166. Thus, the partial content data record that is transmitted to the portable electronic device 22 is identified as partial content data record and is stored by writing or overwriting on to the corresponding database of the portable electronic device 22. The process of receiving the partial content data record at step 164 and storing at step 166 is repeated until each of the partial content data records is stored. After writing or overwriting all partial content data records for which only key fields are transmitted, a request is generated at the portable electronic device 22 and transmitted to the communication system 20, requesting full record content for each partial content data record at step 168.

The request for full record content is received at the synchronization server 30 at step 170 and the full content data record, for which full content is requested, is transmitted to the portable electronic device 22 at step 172.

The full content data record is received by the portable electronic device 22 at step 174 and the portable electronic device 22 determines if sufficient memory is available for storage of the full content of the data record at step 176. The determination of whether or not sufficient memory is available is based on a comparison of available memory on the persistent storage device 52 of the portable electronic device 22 with the size of the full content data record received. If it is determined that there is insufficient memory available (low memory condition), then the full content data record is not saved in the respective database and the synchronization process ends at step 178. If, on the other hand, it is determined at step 176 that sufficient memory is available on the persistent storage device 52 for storage of the full content data record, the full content data record is stored by overwriting over the previously saved partial content data record in the respective database 40, 42, 44 at step 180. After overwriting the full content data record, the next full data record is requested, thus returning to step 168.

In future synchronization processes, partial content data records on the portable electronic device 22 consisting of key fields of data only are identified as such and hash operations for each such record are based on the key fields only. Thus, the hash generated at step 126 at the portable electronic device 22 is based on the key fields of data for all partial content data records. Correspondingly, for the those full records on the synchronization server 30 that correspond to partial content data records on the portable electronic device 22, each hash generated at step 134 at the synchronization server 30 is based on the key fields of data only. Thus, the comparison of hash information for these records is based on hashes generated from the key fields of data at step 136. When the key fields of data records match, the hash values match and no update is carried out.

Figure 6:
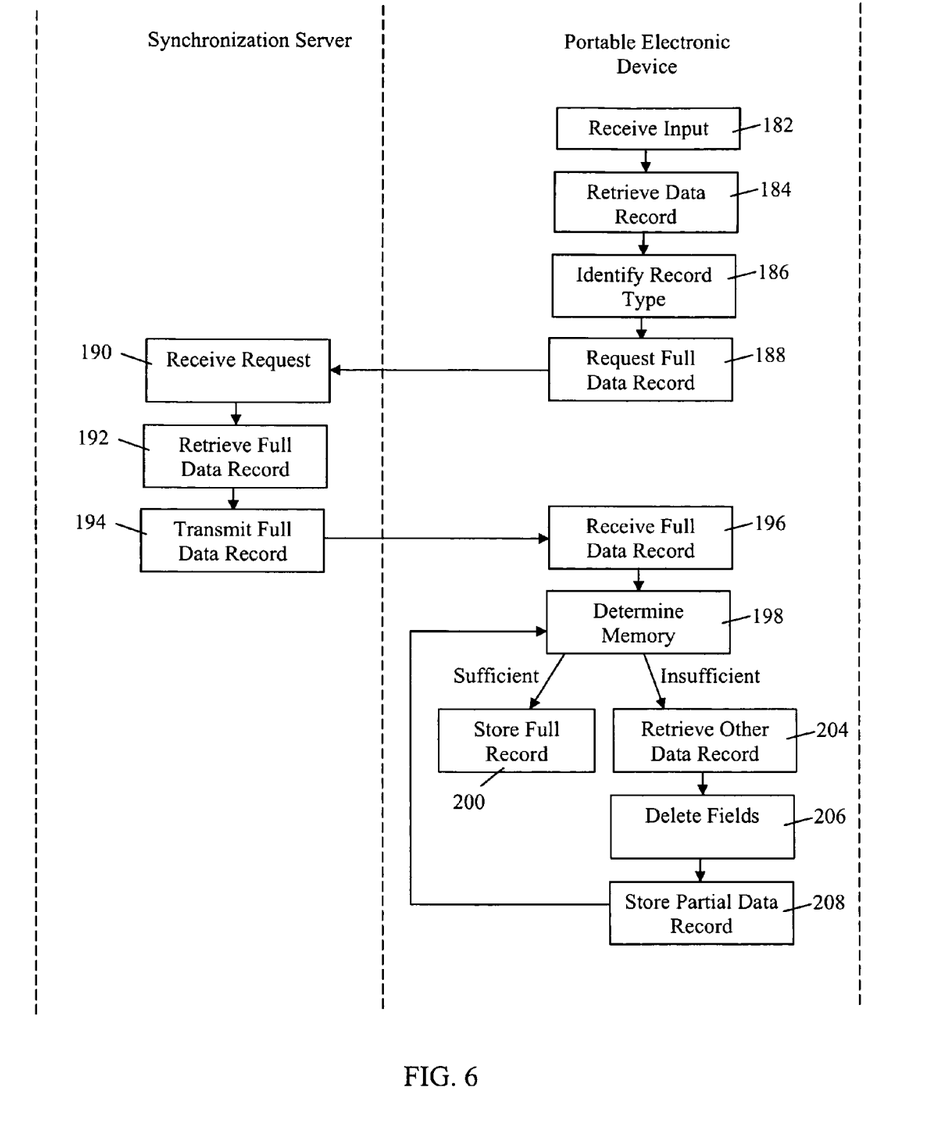
FIG. 6 is a sequence diagram illustrating functions carried out at both the portable electronic device and the communication system when a partial content data record is accessed by a user.

Reference is now made to FIG. 6 which shows a sequence diagram illustrating functions carried out at both the portable electronic device 22 and the communication system 20 when a partial content data record containing only key fields is accessed by a user of the portable electronic device 22. Yet again, coding of software for carrying out such steps is well within the scope of a person of ordinary skill in the art.

When a user attempts to access a record by attempting to open the record using the input and output devices 54, 56 on the portable electronic device 22, the portable electronic device 22 receives the input requesting the data record at step 182. At step 184 the data record which is identified as being a partial content data record is retrieved from the database to which it belongs at step 186. Based on the information contained in the partial content data record, a request for the corresponding full content data record is generated and transmitted to the communication system 20 at step 188.

The synchronization server 30 receives the request for the full content data record at step 190 and retrieves the full content data record from the appropriate one of the databases 34, 36, 38 at step 192. The full content data record is transmitted to the portable electronic device at step 194.

The full content data record is then received at the portable electronic device 22 at step 196 and the portable electronic device 22 determines if sufficient memory is available for storage of the full content data record at step 198. The determination of whether or not sufficient memory is available is based on a comparison of available memory on the persistent storage device 52 of the portable electronic device 22 with the size of the full content data record received. If it is determined at step 198 that sufficient memory is available on the persistent storage device 52 for storage of the full content data record, the full content data record is stored by overwriting over the previously saved partial content data record in the respective database 40, 42, 44 at step 200.

If, on the other hand, it is determined that there is insufficient memory available (low memory condition), then a second full content data record previously saved is retrieved at step 204 from the same one of the databases 40, 42, 44 of the portable electronic device 22, in which the full content data record received at step 196 is to be stored. All fields except the key fields of the second full content data record are deleted at step 206, thereby converting the second full content data record to a partial content data record containing only key field data. The newly converted partial content data record is then overwritten over the previously stored second full content data record and is identified as a partial content data record, thereby freeing up available memory space in the appropriate database at step 208. The portable electronic device 22 then returns to step 198 to determine if there is now sufficient memory to store the full content data record received at step 196. Thus, the process of converting full content data records to partial content data records continues until sufficient memory is available to store the full content data record received at step 196. Thus, partial content data records can be selectably transmitted in full from the synchronization server 30 to the portable electronic device 22.

As described hereinabove, a request is generated at the portable electronic device 22 and transmitted to the communication system 20, requesting full record content for each partial content data record at step 168. It is contemplated that in addition to being identified as a partial content data record, each data record can also have associated with it, an assigned priority for transfer of the associated full content data record. Thus, the order of full content data records requested is dependent on the assigned priority. The full content data record for a data record that is assigned a high priority is requested prior to requesting the full content data record for a data record that is assigned a low priority. The priority can be determined based on a number of factors. For example, priority can be assigned based on the frequency that the particular data record is accessed or based on the time or date last accessed. Thus, frequently accessed data records can be assigned a high priority to ensure that the full content data record is stored and available on the portable electronic device 22. It is also contemplated that the priority can be user-defined or assigned according to any other suitable technique.

Advantageously, partial content data records are received at the electronic device. The partial content includes key fields of data sufficient to uniquely identify the one of said changed second data records in which said key fields of data are contained. Thus, less memory is consumed when storing the data records for which only partial content is transmitted.

While the embodiment described herein is directed to a particular implementation of the method and apparatus for memory management in an electronic device, it will be understood that modifications and variations to this embodiment are within the sphere and scope of the present application. For example, it will be understood that the portable electronic device 22 is not limited to three databases as any suitable number of databases is possible. Similarly, the communication system 20 may include any suitable number of databases. Also, although certain data records are transferred only in part in the above-described embodiment, until a user attempts to access that data record, it is contemplated that the corresponding full content data records can be transmitted in full at any other suitable time. It will also be understood that the steps described hereinabove are not limited to the order in which they are described. For example, the transmission of key fields of data at step 162 can occur at the same time that the fetch request is transmitted in step 142 and thus the fetch request is "piggybacked" on the transmission of key fields of data. Still other orders of steps are possible, as may occur to those skilled in the art. Also, the order of database records transferred, either full or partial, can be determined based on, for example, the assigned priority associated with the data record. As indicated above, such an assigned priority can be, for example user-defined or assigned according to any other suitable means.

Many other modifications and variations may occur to those skilled in the art. All such modifications and variations are believed to be within the sphere and scope of the present application.

What is claimed is:

1. A method for memory management in an electronic device, the method comprising:
   receiving at said electronic device, partial content data records;
   storing said partial content data records in a memory of said electronic device;
   receiving a full content data record corresponding to one of said partial content data records;
   determining whether or not sufficient memory is available in said memory of said electronic device to store said full content data record and, if so, writing said full content data record over the corresponding partial content data record stored in said memory; and
   repeating said receiving and determining until either:
      full content data records corresponding to each of said partial content data records are received; or
      a low memory condition is determined in said memory,
   wherein the partial content data records comprise key fields of data sufficient for uniquely identifying corresponding full content data records at a second electronic device.

2. The method according to claim 1, wherein ones of said partial content data records remain stored in said memory of said portable electronic device.

3. The method according to claim 2, further comprising requesting a full content data record corresponding to one of the partial content data records that remains stored in said memory of said portable electronic device in response to a user input at an input device of said electronic device.

4. The method according to claim 3, further comprising receiving the requested full content data record.

5. The method according to claim 4, further comprising determining whether or not sufficient memory is available in said memory of said electronic device and,
   if sufficient memory is determined to be available, then writing said requested full content data record over the corresponding partial content data record stored in said memory.

6. The method according to claim 5, wherein if insufficient memory is determined to be available, said method further comprises:
   deleting fields of another data record stored in said memory to thereby provide available memory; and
   storing said requested full content data record over the corresponding partial content data record.

7. The method according to claim 6, wherein said deleting fields of at least another data record comprises:
   retrieving said another data record from said memory;
   deleting all except key fields of said another data record to provide another partial content data record; and
   writing said another partial content data record over said another data record on said memory.

8. The method according to claim 2, further comprising:
   requesting a full content data record corresponding to one of the partial content data records that remains stored in said memory of said portable electronic device;
   determining whether or not sufficient memory is available in the memory of said portable electronic device to store the requested full content data record in said memory of said electronic device and,
   if sufficient memory is determined to be available, then writing said requested full content data record over the corresponding partial content data record stored in said memory;
   if insufficient memory is determined to be available, then:
      retrieving another data record from said memory;
      deleting all except key fields of said another data record to provide another partial content data record;
      writing said another partial content data record over said another data record on said memory; and
      repeating said determining whether or not sufficient memory is available to store the requested full content data record and subsequent steps until sufficient memory is available and said full content data record is written over the corresponding one of the partial content data record stored in said memory.

9. The method according to claim 1, wherein receiving a full content data record comprises receiving said full content data record in an order based on an assigned priority.

10. An electronic device comprising:
    a receiver for receiving partial content data records and for receiving full content data records corresponding to said partial content data records;
    a memory for storing said partial content data records; and
    a processor operably coupled to said receiver and said memory for determining for each of the received full content data records whether or not sufficient memory space is available in said memory and, if so, causing said memory to store each of the received full content data records, one at a time, over the corresponding partial content data record stored in said memory until either full content data records corresponding to all said partial content data records are stored or until a low memory condition is determined in said memory,
    wherein the partial content data records comprise key fields of data sufficient for uniquely identifying corresponding full content data records at a second electronic device.

11. A computer-readable storage medium having computer readable code embodied therein for:
    receiving at said electronic device, partial content data records;
    storing said partial content data records in a memory of said electronic device;
    receiving a full content data record corresponding to one of said partial content data records;
    determining whether or not sufficient memory is available in said memory of said electronic device and, if so, writing said full content data record over the corresponding partial content data record stored in said memory; and
    repeating said receiving and determining until either:
       full content data records corresponding to each of said partial content data records is received; or
       a low memory condition is determined in said memory,
    wherein the partial content data records comprise key fields of data sufficient for uniquely identifying corresponding full content data records at a second electronic device.

* * * * *